Oct. 17, 1950 B. H. BREEDLOVE 2,526,001

TRANSMITTER

Filed April 27, 1946 2 Sheets-Sheet 1

INVENTOR.
BERNARD H. BREEDLOVE

BY
Boyken, Mohler & Beckley

ATTORNEYS

INVENTOR.

BERNARD H. BREEDLOVE

BY

Boyken, Mohler & Beckley

ATTORNEYS.

Patented Oct. 17, 1950 2,526,001

UNITED STATES PATENT OFFICE 2,526,001

TRANSMITTER

Bernard H. Breedlove, Atlanta, Ga.

Application April 27, 1946, Serial No. 665,358

2 Claims. (Cl. 178—82)

This invention relates to a transmitter of generally the type disclosed in United States Letters Patent to Martin, No. 842,154, January 22, 1907, and which transmitters are now used in sending messages by wireless or radio, as well as by cable.

In the above type of transmitter, there is a laterally movable finger manipulated key. Movement of the key in one lateral direction closes an electrical circuit continuously by producing dash signals, while movement of the key in the opposite direction causes intermittent closing of the circuit at predetermined intervals producing the dot signals. The transmitter includes a vibrator that automatically vibrates at a predetermined rate when the last of the two movements above mentioned is made so that the rate of vibration is substantially constant, but means is provided for changing this rate. Thus, a slow sender adjusts the vibrator to vibrate relatively slowly, whereas a fast sender adjusts the vibrator for fast vibration.

In actual practice the operator does not have time to adjust the vibrator should he wish to send his messages slower or faster, hence he adjusts the vibrator to suit his particular speed of sending, with the result that the reception by an operator of messages sent by a fast sender is not always accurate or even received at all if the receiver does not have ability equal to that of a sender.

With the present invention the transmitter is provided with means for sending at different speeds without stopping to adjust the vibration and the principal object of this invention is to provide a transmitter having such means therein.

For example, with the present invention there is a vibrator that is adjusted by the operator to suit his particular speed and there is another vibrator actuated by the same key for slower sending, should the operator normally be a fast sender. A mere flick of switch on the transmitter renders either of the vibrators operative, as desired. Thus, assuming that a fast sender on shipboard sends out a call and receives a slow answer, he may practically instantly convert his transmitter to one that will send the dots at a slower frequency, thereby coming within range of the capacity of the person receiving his call. Of course, the conversion works both ways, thereby enabling a slow sender to instantly convert his transmitter to one sending dots at high frequency, if desired.

Another object of the invention is the provision of a transmitter having the vibrators and other portions enclosed in a compact housing with practically all of the working parts on a panel that forms one vertical wall of the housing.

Other objects and advantages will appear in the description and drawings.

Figures 1, 2:
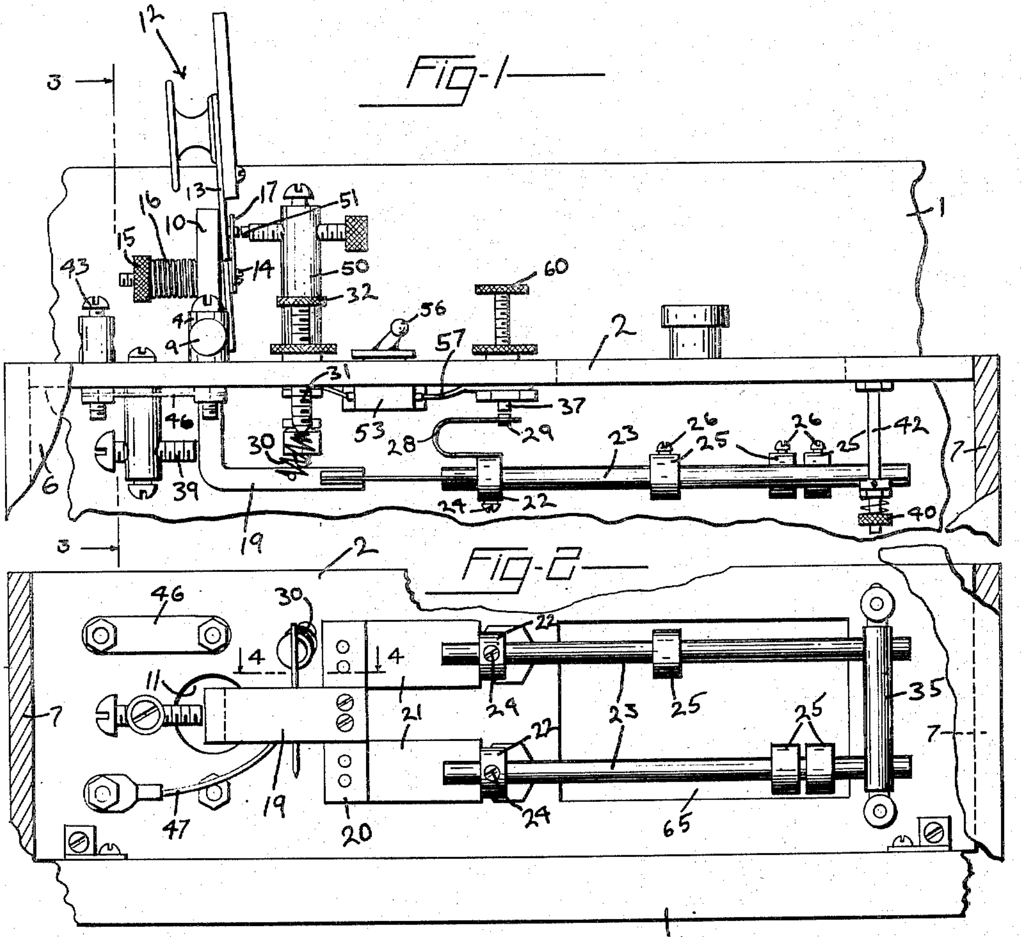
Fig. 1 is a plan view of the transmitter with part of the base and housing broken away and part of the latter shown in section.
Fig. 2 is a side view of the transmitter with the housing broken away and in section, showing the vibrators.

In detail, the transmitter illustrated in the drawings comprises a relatively heavy horizontally elongated rectangular base 1 that has a vertically disposed panel 2 secured thereon, which panel is also rectangular and extends longitudinally of the base 1 and spaced between the longitudinally extending edges of the latter. The weight of this base insures stability of the transmitter when using the latter.

A pair of horizontally extending members 4, 5 are secured at one of their ends to panel 2 adjacent one end of the latter (Fig. 3) and which members project from the side of the panel that is exposed at all times, as will be later explained, since the opposite side of said panel is covered by the walls of a receivable housing 6 of particylindrical form having ends 7 at the ends of panel 2 and base 1, and the cylindrical portion of which housing extends from the upper edge of the panel (and over it) to one of the longitudinal edges of the base 1.

The members 4, 5, are spaced one above the other, and carry coaxial, vertically extending screws 9 for movement vertically toward and away from each other upon rotation thereof. The adjacent ends of screws 9 are formed to provide bearing pins pivotably engaging the upper and lower sides of key arm 10 for rotation of said arm horizontally about the axis of said screws.

The key arm 10 extends substantially at right angles from the panel 2, and goes past said screws through an opening 11 (Fig. 2) in said panel into the space enclosed by housing 6.

The other end of arm 10 carries the manually manipulated key 12 for actuating the key arm. The key includes a plate 13 (Fig. 1) that is yieldably held to the left (as seen in Fig. 1) by means of a spring urged pin 14 that extends through arm 10 and in engagement with said plate 13. A nut 15 on said pin provides means for increasing or decreasing the tension on spring 16 that holds said plate to the left. A contact element 17 is secured to arm 10 and movable to the right (as seen in Fig. 1) upon movement of key 12 to the right. Contact element 17 and arm 10 are electrical conductors, as is the member 4.

Inside housing 6, the arm 10 is bent at right angles to provide a section 19 extending longitudinally of panel 2 and alongside the latter for a short distance.

Adjacent the free end of section 19 of arm 10 is centrally secured a vertically extending cross piece 20, and a pair of horizontally extending leaf springs 21 are secured in vertically spaced relation to said cross piece at one of their ends (Fig. 2). Collars 22 are respectively secured to the outer ends of leaf springs 21, and parallel rods 23 respectively extend through said collars in a direction longitudinally of springs 21 away from the latter. A set screw 24 in each collar adjustably secures each rod to each collar.

One or more weights 25 are secured on each of the rods 23 by means of set screws 26 (Fig. 1). These weights are slidable relatively to any desired positions on rods 23.

The rods 23 and springs 21 comprise the vibrators.

Figures 5, 6:
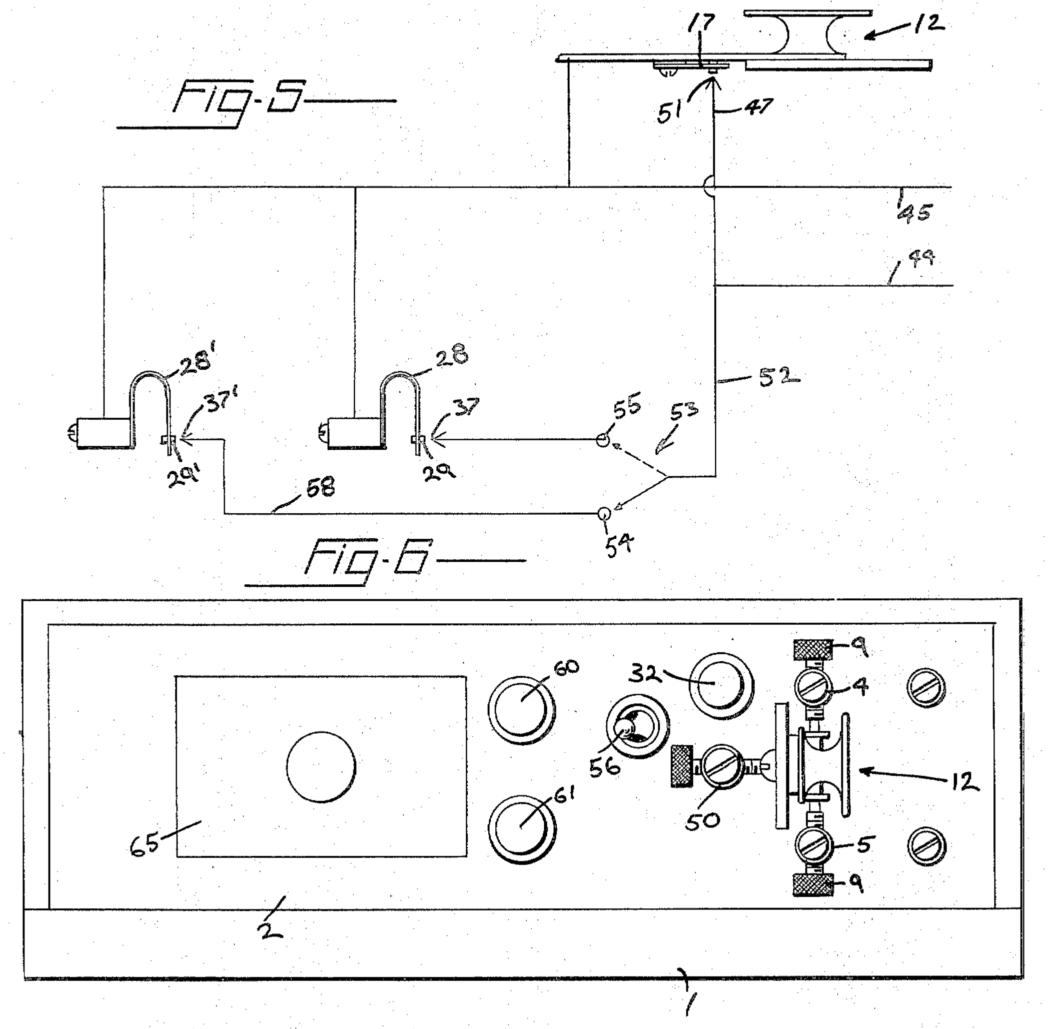
Fig. 5 is a schematic view of the electrical circuit.
Fig. 6 is an elevational side view of the transmitter looking from the side opposite that shown in Fig. 2.

Collars 22 each have a generally U-shaped, spring contact device thereon, one being designated 28 and the other 28′ (Figs. 1, 5). These contacts are secured to collars 22 at one of their ends and the opposite ends have contact points 29, 29′, facing panel 2. Thus the spring elements 28 are between the collar 22 and the panel 2.

A compression spring 30 is positioned between section 19 of arm 10 and panel 2, said spring being secured at one of its ends to said section and at its opposite end to a screw 31 that extends through the panel 2. An extension 32 of screw 31 projects from the exposed side of the panel for manual turning. Upon rotation of said screw in one direction the spring 30 will be compressed so as to yieldably urge section 19 and rods 23 away from the panel 2. Upon rotation of screw 31 in the opposite direction, this compression is lessened. Thus any desired degree of compression of spring 30 is obtained.

A vertical rubber covered bumper or stop 35 at the outer ends of rods 23 engages said outer ends so that the rods cannot be moved past said bump upon compression of spring 30 as already described.

Below the screw 31 is a stop 36 (Fig. 4) that limits the movement of section 19 of arm 10 in a direction toward the panel 2. This stop is adjustable to any desired degree of swing to section 19 and rods 23, but ordinarily, the said stop is positioned to substantially prevent the contact points 29 from engaging stationary contact points 37, 37′ on panel 2 (Figs. 1, 5) except under vibration of the rods 23. Thus when the key 12 as seen in Fig. 1 is moved to the left, the section 19 will move toward the panel 2 and will bump the stop 36. The inertia of such movement will cause rods 23 to vibrate so that the contact points 29 will intermittently engage stationary contact points 37, 37′.

An adjustable stop 39 is also provided on panel 2 for engaging the arm 10 at about the bend in the latter, and the bumper 35 is horizontally adjustable at its ends by means of adjusting screws 40 on posts 42 that in turn extend through the upper and lower ends of said bumper. Thus the bumper 35 is adjustable to insure simultaneous engagement between them and the rods 23.

A pair of vertically spaced binding posts 43 extend through the panel 2 at the end adjacent key 12 for connection with power wires of an electrical circuit. These wires (not shown but indicated at 44, 45 in Fig. 5 respectively) connect with said posts 43 at the exposed side of panel 2. The posts extend through the panel 2 and at their opposite ends inside housing 6, one is connected by a conductor 46 with the upper member 4 that carries arm 10, thus providing a connection with said arm, while a conductor 47 connects the outer post with a laterally projecting conductor element 50 that has an adjustable contact point 51 adapted to be engaged by the contact element 17 on arm 10 when arm 10 is moved to the right as seen in Fig. 1.

The conductor 44 (Fig. 5) is connected by a wire 52 (Fig. 5) with a two way toggle switch 53 having contacts 54, 55 therein. Said switch is carried on panel 2 and the handle 56 for operating it projects from the exposed side of panel 2.

Both of the spring elements 28, 28′ are not shown in Fig. 1, but they are indicated in Fig. 5, and are one above the other in Fig. 1 the spring element 28′ being directly below element 28. The same is true of the contact points 37, 37′, one being opposite each of the points 29, 29′ on element 28, 28′.

One contact 55 in switch 53 is connected by a line 57 with stationary contact point 37, while a line 58 (Fig. 5) connects the outer contact point 54 in switch 53 with the contact point 37′. In Fig. 6, the heads of a pair of adjustable screws 60, 61 are shown, the upper screw 60 carrying contact point 37 at its opposite end while screw 61 carries contact point 37′ at its opposite end. Thus the contact points 37, 37′, while normally being stationary, are adjustable toward and away from the contacts 29, 29′.

By the foregoing structure, when the key 12 (Fig. 5) is moved to bring contact element 17 into engagement with contact point 51, a dash will be sent, since the contact will be continuous as long as the operator holds the key in said position.

Figures 3, 4:
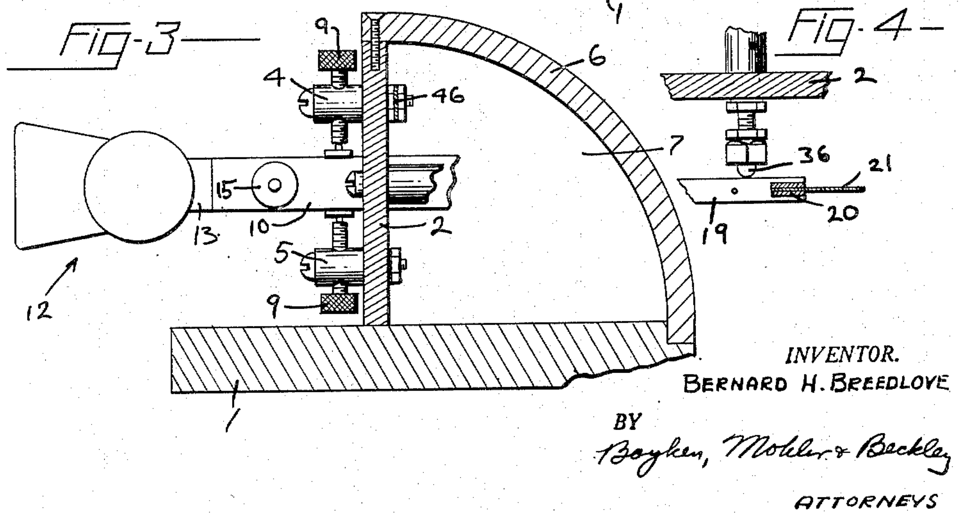
Fig. 3 is a sectional view through the housing as seen from line 3—3 of Fig. 1, but omitting the vibrators and most of the parts in the housing beyond the section line.
Fig. 4 is a fragmentary sectional view along line 4—4 of Fig. 2.

Upon release of the key 12, it will move to neutral position, but upon moving it to the left, as seen in Fig. 4, the section 19 will strike stop 36 and the rods 23 will vibrate so as to intermittently move the contact points 29, 29′ into engagement with the contact points 37, 37′. However, the circuit will be closed between only one of said set of contacts, according to the position of switch 53. If the contact 55 in the switch is closed, then a series of successive dots will be produced by engagement between contacts 29, 37, but if contact 54 is closed, the dots will be produced by engagement between contacts 29′, 37′.

The weights 25 on the lowermost rod 23 as seen in Fig. 2 are positioned near the outer end of said rod, hence the vibration of said lower rod 23 will be slower than the vibration of the upper rod 23 inasmuch as there is only one weight on the upper rod 23 and it is nearer the spring 21. Thus the intermittent engagement between contacts 29, 37 will be substantially more frequent than between contacts 29', 37'.

In actual operation, the operator would most likely set the weights or weight on upper rod 23, as seen in Fig. 2 to send dots at his fastest sending speed, which would likely correspond with his fastest receiving speed. The weights on lower rod 23 would be adjusted to send dots at a slower speed. As dots occur with far more frequency in the Morse code than dashes, the ability of the operator to produce the dots at a fast rate of speed generally is indicative of his sending and receiving speed.

Should an answer to a call come in at a speed appreciably lower than the sending speed of the calling station, the operator at the latter station can instantly actuate switch 53 so that the vibration of the lower or slower rod 23 will do the sending, instead of the fast upper arm.

The enclosing of all working parts in housing 6, with practically all of the adjusting elements exposed on panel 2, including switch handle 53, provides a compact and neat transmitter that is not likely to become injured.

The panel 2 is preferably formed with an opening opposite the weights 25, that is covered by a removable door 65 so as to enable access to the weights, should an adjustment thereof be desirable.

It is to be understood that in actual operation the key 12 generally extends from panel 2 toward the operator, hence the actual movement of the key 12 for closing contacts 17, 15 would be to the left and movement of the key to the right would effect the intermittent closing of the contacts 29, 37 or 29', 37' according to the position of switch 53.

It is to be understood also that the detailed description and drawings are not to be considered restrictive of the invention but merely illustrative thereof.

I claim:

1. A telegraphic transmitter for sending signals such as in the Morse code comprising, a single, manually actuatable key lever supported for generally oscillatory movement by the fingers of the operator, an electrical circuit, a pair of spaced terminals in said circuit, a pair of contacts in said circuit, resilient means connecting said contacts with said lever and supporting said contacts for simultaneous vibratory movement at different rates of vibration into and out of engagement with said terminals, a manually actuatable switch in said circuit for selectively restricting current in said circuit to one or the other of said contacts whereby the signal to be transmitted will be at the rate of vibration of the contact to which the current in said circuit is so restricted.

2. A telegraphic transmitter for sending signals comprising, a pair of contacts, supported for vibration at different frequencies corresponding to that employed for sending Morse code signals at a relatively slow rate and at a relatively fast rate, separate spring elements respectively supporting said contacts for simultaneous vibrating at said rates upon actuation of said elements, a telegraphic key supported for oscillatory movement by the fingers of an operator and connected with said elements for actuating the latter upon said movement in one direction, an electrical circuit, a pair of terminals in said circuit engageable with said contacts at said different rates of vibration upon actuation of said elements, an electrical circuit, said contacts and said terminals being in said circuit and a switch in said circut for selectively restricting the flow of current to one or the other of the said contacts as desired whereby the dot-dash signal to be transmitted will be at the speed of the contact to which the current is restricted.

BERNARD H. BREEDLOVE.

REFERENCES CITED

The following references are of record in the file of this patent:

UNITED STATES PATENTS

| Number | Name | Date |
|---|---|---|
| 842,154 | Martin | Jan. 22, 1907 |
| 1,190,259 | Allen | July 11, 1916 |
| 1,224,187 | Mahoney | May 1, 1917 |
| 2,198,901 | Boswau | Apr. 30, 1940 |
| 2,307,521 | Lovell | Jan. 5, 1943 |